Figure 1:
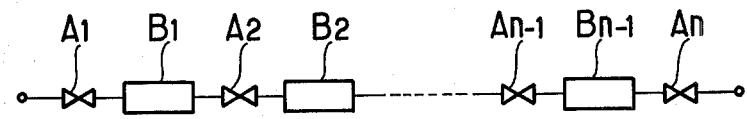

United States Patent [19]

Brzozowski

[11] 4,217,554
[45] Aug. 12, 1980

[54] CIRCUITS FOR REDUCING INTERMODULATION NOISE

[75] Inventor: Henri Brzozowski, Colombes, France

[73] Assignee: Societe Anonyme, Compagnie Industrielle des Telecommunications Citalcatel, Paris, France

[21] Appl. No.: 2,092

[22] Filed: Jan. 9, 1979

[30] Foreign Application Priority Data

Jan. 25, 1978 [FR] France .................. 78 02006

[51] Int. Cl.$^2$ ................... H03F 1/26; H03F 3/68
[52] U.S. Cl. ...................... 330/124 R; 330/149; 330/151
[58] Field of Search ........... 330/149, 124 R, 295, 330/151; 328/163

[56] References Cited

U.S. PATENT DOCUMENTS

| | | | |
|---|---|---|---|
| 3,202,928 | 8/1965 | Prior | 330/124 R |
| 3,732,502 | 5/1973 | Seidel | 330/149 |
| 3,825,843 | 7/1974 | Felsberg et al. | 330/149 X |
| 4,131,859 | 12/1978 | Valle | 330/149 X |

OTHER PUBLICATIONS

Kogan et al., "Transit Apparatus for Tertiary Groups with Amplitude Correction (STTG) and with Amplitude and Phase Correction (STTG-FK)," *Telecommunications and Radio Engineering*, vol. 28-29, No. 9, Sep. 1974, pp. 11-13.

*Primary Examiner*—James B. Mullins
*Attorney, Agent, or Firm*—Roland Plottel

[57] ABSTRACT

Apparatus for reducing the intermodulation noise generated in a chain of amplifiers. The apparatus includes a first phase-shift circuit for at least partially compensating for the phase distortion and phase jumps in the chain and a balancing circuit including a source of compensating noise.

The compensating noise is inverted, then added to the original signal to cancel the distortion generated in the chain. In one embodiment, the source of the compensating noise is a series of amplifiers and phase-shift networks which simulate the transmission characteristics of the actual amplifier chain.

7 Claims, 3 Drawing Figures

CIRCUITS FOR REDUCING INTERMODULATION NOISE

The present invention relates to the reduction of intermodulation noise generated in a chain of amplifiers which is constituted, for example, by a cable transmission link including repeaters. It relates more particularly to intermodulation noise reducing circuits which are connected at the output of the chain and which use a source that generates a compensation noise on the basis of the signal available at the output of the chain.

Such circuits are described in the commonly assigned U.S. Pat. No. 4,131,859. They include a phase-shifter circuit followed by a balancing circuit in which the source of compensation noise is disposed. The phase-shifter circuit compensates a greater or lesser part of the phase distortion and the phase jumps due to the chain of amplifiers. The source of compensation noise is an image from the point of view of non-linearity of a greater or lesser length of the chain of amplifiers.

The calculations performed in the abovementioned patent application show that perfect compensation is theoretically possible only when the source of compensation noise is an exact image of the chain of amplifiers from the point of view of non-linear distortion. In most cases, complying with this condition would lead to the use of a source of compensation noise which would be much too complex.

The aim of the present invention is obtain a useful reduction of intermodulation noise using a source of compensation noise which is not excessively complex.

It provides a circuit for reducing the intermodulation noise generated by the chain of amplifiers, said circuit being for connection to the output of the chain of amplifiers and comprising a phase shifter circuit at its input for compensating for at least a part of the phase distortion and the phase jumps of the chain of amplifiers, and a balancing circuit following the said phase shifter circuit and provided with a source of compensation noise constituted by a series of amplifiers each having the non-linearity defects of one of the amplifiers of the chain and being separated from each other by phase shifter circuits which give the said series of amplifiers the same phase law, to the nearest $2K\pi$, as that of the chain of amplifiers.

The present invention also provides a circuit for reducing intermodulation noise generated in a chain of amplifiers connected to the output of the said chain and comprising a phase shifter circuit at its input for compensating for at least a part of the phase distortion and the phase jumps of the chain of amplifiers, and a balancing circuit following the said phase shifter circuit and provided with a source of compensation noise having the same non-linearity defects as a more or less lengthy part of the chain, and frequency filters neutralising the action of the source of compensation noise over a part of the pass band of the chain of amplifiers.

Figure 2:
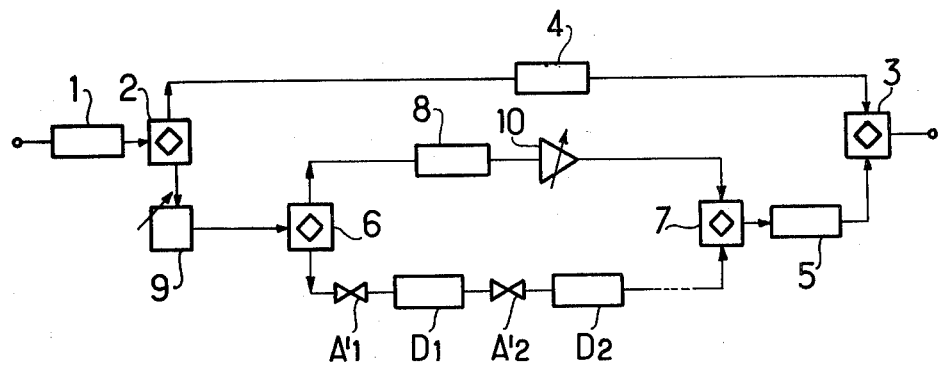
Figure 3:
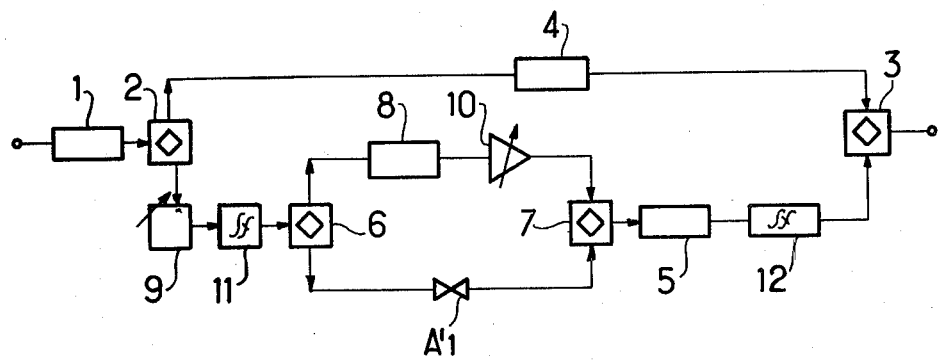

Other characteristics and advantages of the invenion will appear from the accompanying claims and from the following description of two embodiments, given by way of example. The description is made with reference to the drawing in which:

FIG. 1 is the equivalent circuit of a chain of amplifiers adopted for the calculation which accounts for the reduction of intermodulation noise obtained with circuits in accordance with the invention; and FIGS. 2 and 3 are block diagrams of two intermodulation noise reducing circuits in accordance with the invention.

Intermodulation noise is due to non-linear defects of amplifiers. It is essentially generated by active elements, and particularly those in the last stages because of the greater amplitude of the signals involved. While it may be made negligible in a well-designed amplifier, the same is not true of a chain of amplifiers where the compounding of intermodulation noise generated by different amplifiers ends up by constituting a large part of the total noise. The intermodulation noise is correlated to the input signal of the chain and the circuits which are described below use this property to partially compensate the noise. In order to explain their operation it is necessary to begin by recalling the expression for the components of intermodulation noise at the output of a chain of amplifiers.

This calculation was shown in the said prior patent application for a cable transmission link using repeaters. Such a link constitutes one of the types of amplifier chains where reducing intermodulation noise is of most interest. In such a link, the repeaters are disposed between sections of cable having the same length and the gains of their amplifiers are adjusted so that the level of the transmission signal is the same at the end of each section of cable. To a first approximation a repeater followed by a section of cable may be assimilated to a point of non-linearity followed by a linear network of lumped and distributed constants which introduce neither loss nor gain and which have a phase law equivalent to that of a section of cable associated with a repeater. FIG. 1 shows the equivalent circuit adopted for such a link. This circuit is formed from a chain of N non-linearity points $A_1, A_2, \ldots A_N$ separated by $N-1$ linear networks $B_1, B_2, \ldots B_{N-1}$ having unity gain and a phase law $\beta(\omega)$. A signal x applied to the input of the chain of amplifiers is assumed to be composed of n fundamental sinusoidal components of angular frequencies $\omega_1, \omega_2, \ldots \omega_n$ having initial phases $\phi_{01}, \phi_{02}, \ldots \phi_{0n}$ and initial amplitudes $U_1, U_2, \ldots U_n$. The output signal y of the chain has the form:

$$y = \sum_{i=1}^{n} U_i \cos[\omega_i t + \phi_{oi} + (N-1)\beta(\omega_i)] \quad (1)$$

By assuming that the intermodulation products generated at each point of non-linearity $A_1, A_2, \ldots A_N$ are of sufficiently small amplitude with respect to the amplitudes $U_1, U_2, \ldots U_n$ of the components of the signal x to be negligible in the subsequent generation of further intermodulation products, it can be shown that the signal y is accompanied by intermodulation noise $V_N$ of the form:

$$V_N = \sum_{p \in p'} U_{op} \frac{\sin \frac{N\theta_p}{2}}{\sin \frac{\theta_p}{2}} \cos\left[(p(\omega)t + \psi_p + \frac{(N-1)\theta_p}{2})\right] \quad (2)$$

where P' is the set of linear forms p defined by the sequence of co-efficients $\epsilon_{p1}, \epsilon_{p2}, \ldots \epsilon_{pn}$ having integral values for the n components of the input signal x and excluding the linear forms defined by a single co-efficient $\epsilon_{pi}$ having a non zero value equal to unity which corresponds to the fundamental components of the input signal x. The use of linear forms in this case is a means of simplifying the notation. The terms $p(\omega)$, $\psi_p$ and $\theta_p$ are defined by the equations:

$$p(\omega) = \sum_{i=1}^{N} \epsilon_{pi} \omega_i \qquad (3)$$

$$\theta_p = \sum_{i=1}^{N} \epsilon_{pi}\beta(\omega_i) - \beta\left[\sum_{i=1}^{n} \epsilon_{pi}\omega_i\right] \qquad (4)$$

$$\psi_p = \sum_{i=1}^{n} \epsilon_{pi}\phi_{oi} + (N-1)\beta\left[\sum_{i=1}^{n} \epsilon_{pi}\omega_i\right] \qquad (5)$$

where $U_{Op}$ is the amplitude of the intermodulation noise component which corresponds to the linear form p.

Equation (3) makes it possible to perform the conventional distinction between orders of different intermodulation noise components since the order of a component of an intermodulation product associated with a linear form p is equal to:

$$\sum_{i=1}^{n} |\epsilon_{pi}|$$

This will be used below to explain the operation of the intermodulation noise reducing circuit shown in FIGS. 2 and 3.

The intermodulation noise reducing circuit shown in FIG. 2 has a phase-shifter circuit 1 at its input with a phase law $\beta'(\omega)$. The phase-shifter circuit 1 is followed by a balancing circuit having two main branches which are separated and rejoined by hybrid couplers 2 and 3. One of the main branches includes a phase-shifter circuit 4 having a phase law $\gamma(\omega)$; the other includes two secondary branches which are separated and rejoined by two hybrid couplers 6, 7 connected in series with an artificial line 9 of adjustable loss and a phase inverter circuit 5. One of the secondary branches includes a phase-shifter circuit 8 having a phase law $\eta(\omega)$ in series with an adjustable gain amplifier 10; the other includes a source of compensation noise formed by a sequence of R amplifiers $A'_1, A'_2, \ldots A'_R$ of unity gain separated by phase-shifter circuits $D_1, D_2, \ldots D_{R-1}$ which are identical to each other and whose phase law is $\delta(\omega)$. The phase law $\eta(\omega)$ of the phase-shifter circuit 8 is defined by the equation:

$$\eta(\omega) = (R-1)\delta(\omega) + \pi + 2K\pi. \qquad (6)$$

This makes it possible, in conjunction with appropriate adjustment of gain of the amplifier 10 to eliminate from the output of the hybrid coupler 7 the signal which is applied to both of the secondary branches of the balancing circuit via the hybrid coupler 6. The intermodulation noise of the compensation source is thereby isolated from the component of the signal which was used to generate it.

The signal y at the output of the chain accompanied by the intermodulation noise generated by the chain is applied to the input of the hybrid coupler 2 via the phase-shifter circuit 1 which at least partially corrects for the phase distortions and the phase jumps due to the chain of amplifiers. This signal arrives at the output of the circuit via one of the outputs of the hybrid coupler 2, the phase-shifter circuit 4 and the hybrid coupler 3. It also arrives at the two secondary branches of the balancing circuit via the artificial loss line 9 and the hybrid coupler 6. In one of the secondary branches it is applied to the source of compensation noise where it originates new intermodulation noise. In the other secondary branch it passes through the phase-shifter circuit 8 and the adjustable gain amplifier 10 where it acquires the amplitude and phase necessary to enable the intermodulation noise of the compensation source to be isolated at the output of the hybrid coupler 7. Once isolated this intermodulation noise is inverted by the phase-inverting circuit 5 before being added by the hybrid coupler 3 to the output signal y of the chain and to the intermodulation noise which accompanies it. The artificial line 9 and the phase circuit 4 are adjusted to obtain a minimum in the intermodualtion noise and the output of the circuit.

In the explanations which follow it will be supposed that the circuit of FIG. 2 is used to reduce the intermodulation noise generated by the transmission link whose equivalent circuit from the point of view of intermodulation noise is shown in FIG. 1. In this case, and in accordance with the invention, the amplifiers $A'_1, A'_2, \ldots A'_R$ belonging to the compensation source are chosen in such a manner as to have the same non-linearity defects as an amplifier of the chain. The phase law $\delta(\omega)$ of the phase-shifter circuits $D_1, D_2, \ldots D_{R-1}$ of the compensation source is chosen in such a manner as to satisfy the equation:

$$(N-1)\beta(\omega) = (R-1)\delta(\omega) \text{ modulo } 2\pi. \qquad (7)$$

By virtue of these characteristics a degree of reduction in the intermodulation noise of the chain of amplifiers is obtained by connecting the circuit which has just been described to the output of the chain. This reduction is obtained by compensation so long as the intermodulation noise due to the compensation source and available at the output of the inverter circuit 5 is added to the appropriately phase-shifted output signal of the chain. This can be seen by comparing the values of the intermodulation products which are applied to the inputs of the hybrid coupler 3.

The intermodulation noise $W_1$ at the output of the phase-shifter circuit 4 and due to the chain of amplifiers is constituted by the intermodulation noise $V_N$ (equation 2) which has passed through the phase-shifter circuits 1 and 4. It therefore has the value:

$$W_1 = \sum_{p \in p'} U_{op} \frac{\sin \frac{N\theta_p}{2}}{\sin \frac{\theta_p}{2}} \cos\left[p(\omega)t + \psi_p + (N-1)\frac{\theta_p}{2} + \beta'(p(\omega)) + \gamma(p(\omega))\right] \qquad (8)$$

The intermodulation noise $W_2$ available at the output of the inverter circuit 5 is due solely to the source of compensation noise since the intermodulation noise coming from the chain of amplifiers is eliminated together with the components of the output signal y in the hybrid coupler 7 which rejoins the two secondary branches of the balancing circuit. Using the notation $\phi_{01}, \phi_{02}, \ldots \phi_{0n}$ for the phase components of the signal y at the input to the chain of amplifiers $A'_1, A'_2, \ldots A'_R$ which constitutes the source of compensation noise, the intermodulation noise $W'_2$ generated by the said source, treated itself as a chain of amplifiers, may be expressed in a form analogous to that of equation (2):

$$W_2' = \sum_{p \epsilon p'} U_{op'} \frac{\sin \frac{R\theta_p'}{2}}{\sin \frac{\theta_p'}{2}} \cos \left[ p(\omega)t + \psi_p' + \frac{R-1}{2} \theta_p' \right] \quad (9)$$

where $$p(\omega) = \sum_{i=1}^{n} \epsilon_{pi} \omega_i$$

$$\theta_p' = \sum_{i=1}^{n} \epsilon_{pi} \delta(\omega_i) - \delta(p(\omega)) \quad (10)$$

$$\psi_p' = \sum_{i=1}^{n} \epsilon_{pi} \phi_{oi}' + (R-1) \delta(p(\omega)) \quad (11)$$

From equations (4), (7) and (10) it can be deduced that $$\theta_p' = \frac{N-1}{R-1} \theta_p$$

Taking into consideration the fact that the input signal x has passed through the chain of amplifiers $A_1$, $A_2$, ... $A_N$ as well as the phase-shifter circuit 1 before arriving at the input to the source of the compensation noise, the phases $\phi'_{oi}$ may be expressed as a function of the initial phases $\phi_{oi}$ as follows:

$$\phi_{oi}' = \phi_{oi} + (N-1)\beta(\omega_i) + \beta'(\omega_i)$$

It can then be deduced from equations (5) and (11) that:

$$\psi_p' = \psi_p + (N-1)\theta_p + (N-1)\beta(p(\omega)) + p(\beta'(\omega))$$

whence $$W_2' = \sum_{p \epsilon p'} U_{op'} \frac{\sin \left( R \frac{N-1}{R-1} \frac{\theta_p}{2} \right)}{\sin \left( \frac{N-1}{R-1} \frac{\theta_p}{2} \right)} \cos \left[ p(\omega)t + \psi_p + \right.$$

$$\left. (N-1)\beta(p(\omega)) + p(\beta'(\omega)) + \frac{3}{2}(N-1)\theta_p \right]$$

The intermodulation product $W_2$ is opposed to the intermodulation product $W'_2$. The hybrid coupler 3 provides an output signal composed of the output signal of the chain y, the intermodulation noise $W_1$ due to the chain, and the intermodulation noise $W_2$ due to the compensation source. For the intermodulation noise $W_1$ to be in phase opposition to the intermodulation noise $W_2$ it is necessary for the following condition to be satisfied:

$$\Gamma_p = \beta'(p(\omega)) - p(\beta'(\omega)) - (N-1)\theta_p - (N-1)\beta(p(\omega)) + \gamma(p(\omega)) = 2K\pi \quad (12)$$

Equation (12) concerning the phases may be satisfied by defining the phase laws $\beta'(\omega)$ and $\gamma(\omega)$ of the phase-shifter circuits 1 and 4 by using the following equations:

$$\beta'(\omega) + (N-1)\beta(\omega) = d\omega + 2K\pi$$

$$\gamma(\omega) = (N-1)\beta(\omega) + 2K\pi$$

The first of these equations enables the first three terms of equation (12) to be cancelled while the second equation cancels the last two. The phase-shifter circuit 1 compensates for phase jumps and phase distortion due to the chain of amplifiers. The phase-shifter circuit 4 compensates for phase delay due to the source of compensation noise. The components of the overall intermodulation products at the output of the hybrid coupler 3 then have amplitudes:

$$\Delta V_p = U_{op} \left[ \frac{\sin \frac{N\theta_p}{2}}{\sin \frac{\theta_p}{2}} - h \cdot \frac{\sin \left( R \frac{N-1}{R-1} \frac{\theta_p}{2} \right)}{\sin \left( \frac{N-1}{R-1} \frac{\theta_p}{2} \right)} \right] \quad (13)$$

The coefficient h expresses the ratio between the amplitudes $U_{op}$ and $U'_{op}$. It may be adjusted by adjusting the loss of the artifical line 9.

Equation (13) concerning the amplitudes shows that it is not possible to cancel the amplitudes of all the intermodulation poriducts without setting the number R equal to the number N, and that the compression improves as the number R approaches the number N. It also shows that the compensation remains good even with a number R which is small in relation to number N for those intermodulation products which have a small angle $\theta$, i.e. for those whose voltages add, in particular, the third order products of the type $A+B-C$. This latter property is very advantageous in the case where second order intermodulation products fall outside the pass band of a chain of amplifiers and where, consequently, third order intermodulation products of the $A+B-C$ type are preponderent. An example of such a chain of amplifiers which may be mentioned is constituted by the upper band amplifiers of the repeaters of $N+N$ systems in which the upper and lower frequency bands are amplified by two distinct amplifiers.

In the circuit which has just been described with reference to FIG. 2, we have attempted to improve the compensation by giving the compensation source the same phase law as the chain of amplifiers and an analogous structure in order to constitute an image of the chain amplifiers. Another method of improving the compensation consists in filtering the signal applied to the source of compensation noise and the signal coming therefrom to eliminate the components of the compensation noise which are unwanted. The intermodulation noise reducing circuit shown in FIG. 3 uses this method. It is particularly intended for a chain of amplifiers whose preponderent intermodulation noise is third order intermodulation noise where the voltages add and are situated at the upper side of the pass band, for example, a connection of the $N+N$ type equipped with repeaters providing separate amplification for upper and lower frequency bands and where the level of the signals at the outputs of the amplifiers is an increasing function with frequency, this particularity being known as pre-emphasis.

It will be noticed on FIG. 3 that this intermodulation noise reducing circuit differs from the previous one, firstly in the structure of the source of compensation noise and secondly by the presence of a high pass filter 11 upstream of the hybrid coupler 6 and a high pass filter 12 following the inverter circuit. The input of this circuit comprises the same phase-shifter circuit 1 having the phase law $\beta'(\omega)$ and a balancing circuit having two main branches which are separated and rejoined by the hybrid couplers 2 and 3. One of the main branches comprises a phase-shifter circuit 4 having a phase law $\gamma(\omega)$; the other comprises an artificial loss line 9, a high pass filter 11, two secondary branches which are separated and rejoined by hybrid couplers 6 and 7, a phase-inverter circuit 5 and a high pass filter 12. One of the secondary branches comprises a phase-shifter circuit 8 having a phase law $\eta(\omega)$ in series with an adjustable gain amplifier 10; the other comprises a source of compensation noise $A'_1$ having non-linearity characteristics whose amplitudes are the same as one of the amplifiers $A_1, A_2, \ldots A_N$ of the chain whose intermodulation noise is to be reduced.

As before, the connection of the source of compensation noise in one of the secondary branches of the balancing circuit has the purpose of isolating the intermodulation noise of the compensation source from the components of the signal at the output of the chain which were used to generate the noise. The phase-shifter circuit 8 and the adjustable gain amplifier 10 are adjusted to achieve this effect. The output signal y of the chain accompanied by the intermodulation noise $V_N$ generated in the chain is applied to the input of the hybrid coupler 2 via a phase-shifter circuit 1 which at least partially corrects for the phase distortions and the phase jumps due to the chain of amplifiers. It arrives at the output of the circuit via one of the outputs of the hybrid coupler 2, the phase-shifter circuit 4 and the hybrid coupler 3. It is also applied via the artifical line 9 to the high pass filter 11 which eliminate the lower frequencies of the signal. The resulting signal arrives at the two secondary branches of the balancing circuit via the hybrid coupler 6. In one of the secondary branches it is applied to the source of compensation noise where it generates new intermodulation noise $W_3$. In the other secondary branch it passes through the phase-shifter circuit 8 and the adjustable gain amplifier 10 where it acquires the phase and amplitude necessary for isolating the intermodulation noise $W_3$ from the source of compensation noise at the output of the hybrid coupler 7. The intermodulation noise $W_3$, once isolated, is subjected to the action of the phase inverter circuit 5 and of the high pass filter 12 before being added by the hybrid coupler 3 to the output signal y of the chain and to the intermodulation noise $V_N$ which accompanies it. The artificial line 9 and the phase-shifter circuit 4 are adjusted in such a manner as to obtain a minimum of intermodulation noise at the output of the circuit.

The compensation obtained can be seen from a comparison of the values of intermodulation noise applied to the inputs of the hybrid coupler 3.

The intermodulation noise $W_1$ at the output of the phase-shifter circuit 4 and due to the chain of amplifiers has the value, as seen above:

$$W_1 = \sum_{p \in P} U_{op} \frac{\sin \frac{N \theta_p}{2}}{\sin \frac{\theta_p}{2}} \cos \left[ p(\omega)t + \psi_p + (N-1)\frac{\theta_p}{2} + \beta'(p(\omega)) + \gamma(p(\omega)) \right]$$

In its pass band, the high pass filter 11 has zero loss and a phase law $\beta''(\omega)$. The sum of the phase shifts suffered by signal between the input to the phase-shifter 1 and the input to the coupler 6 is therefore equal to:

$\beta'(\omega) + \beta''(\omega)$

The intermodulation noise available at the output of the hybrid coupler 7 is solely due to the compensation source. Its value $V''_{N+1}$ obtained by a calculation similar to that for $V'_{N+1}$ in the parent patent (equation 9) is:

$$V''_{N+1} = \sum_{p \in P} U_{op} \cos \left[ p(\omega)t + \psi_p + (N-1)\theta_p + p(\beta'(\omega)) + p(\beta''(\omega)) \right]$$

In its pass band, the high-pass filter 12 has zero loss and a phase law $\beta'''(\omega)$. After passing through the phase inverter circuit 5 and the high-pass filter 12 the intermodulation noise may be expressed as follows:

$$W_3 = -\sum_{p \in P} U_{op} \cos \left[ p(\omega)t + \psi_p + (N-1)\theta_p + p\beta'(\omega) + p\beta''(\omega) + \beta'''(p(\omega)) \right]$$

In order for the intermodulation noise $W_3$ to be in phase opposition to the intermodulation noise $W_1$, the following phase condition must be met:

$$\Gamma_p = \beta'(p(\omega)) - p(\beta'(\omega)) - \frac{N-1}{2}\theta_p - p(\beta''(\omega)) + \gamma(p(\omega)) - \beta'''(p(\omega)) = 2k\pi \quad (14)$$

This condition is achieved if $$\beta'(\omega) + \frac{(N-1)}{2}\beta(\omega) = a \cdot \omega + 2k\pi \quad (15)$$

and $$p(\beta''(\omega)) + \beta'''(p(\omega)) = \gamma(p(\omega)) + 2k\pi \quad (16)$$

Condition (15) enables the first three terms of equation (14) to be cancelled and indicates that the phase-shifter must compensate half of the phase distortion and the phase jumps due to the chain of amplifiers.

The condition (16) gives the phase law $\gamma(\omega)$ of the phase-shifter circuit 4.

A necessary condition for this condition to be met is that the phase law $\beta''(\omega)$ of the high-pass filter 11 should have the form:

$b\omega + 2k\pi$ where b is a constant, in contrast, it is acceptable to satisfy the condition (16) only for a class of intermodulation noise defined by:

$$\sum_{i=1}^{n} \epsilon_{pi} = c$$

where c is a given integer, $\beta''(\omega)$ may have the form:

$\beta''(\omega) = a + b\omega + 2k\pi$ where a and b are constants. By way of example, the intermodulation products of the $A + B - C$ form part of a class of products for which $$\sum_{i=1}^{n} \epsilon_{pi} = 1.$$

The high pass filter 11 must therefore include phase correction networks suitable for satisfying the above conditions, in the range of frequencies where compensation for intermodulation noise is sought. In reality these conditions can only be satisfied with a degree of approximation.

Assuming that the conditions fixed by equations (15) and (16) are satisfied, the components of the overall intermodulation product at the output of the hybrid coupler 3 then have the following amplitudes:

$$\Delta V_p = U_{op} \frac{\sin \frac{N\theta_p}{2}}{\sin \frac{\theta_p}{2}} - h \cdot U_{op} g_1 g_2 \quad (17)$$

in which equation $g_1$ is a function that takes into account the suppression of a certain number of intermodulation products by virtue of the elimination by the high-pass filter 11 of at least one of the fundamental components which could have given rise to them, and $g_2$ is a function which takes into account the suppression by the high-pass filter 12 of a certain number of intermodulation products which are generated by the source of compensation noise $A'_1$. The coefficient h is adjustable by varying the loss of the artificial line 9.

The equation (17) shows that it is possible to compensate those intermodulation products whose voltages add and for which the angle $\theta$ is zero, but that this compensation also causes a modification of other intermodulation products which may turn out to worsen them. Given, under the assumptions made, that the third order intermodulation products whose voltages add are to be found for the most part in the upper end of the pass band, the presence of a filter makes it possible to compensate these third order intermodulation products while avoiding making the intermodulation products in the rest of the band any worse.

The circuit which has just been described with reference to FIG. 3 may be made in many variants. In particular, it may have a more complex noise source, analogous of that described for the circuit of FIG. 2, and having the same non-linearity defects as a greater or lesser length of the chain. The high-pass filters could clearly be replaced by band-stop filters, their characteristics being a function of the characteristics of the input signal to the chain of amplifiers.

A circuit such as that shown in FIG. 3 makes it possible to compensate intermodulation products in a predetermined frequency range. This range may be increased by cascading circuits which operate on different ranges.

I claim:

1. Apparatus for reducing the intermodulation noise generated in a chain of amplifiers, said apparatus being designed for connection to the output of said chain and comprising:
   (a) a first phase-shift circuit, having an input connected to the output of said chain and an output for at least partially compensating for the phase distortion and phase jumps in said chain; and
   (b) a balancing circuit having an input connected to the output of said first phase-shift circuit, said balancing circuit including a source of compensation noise comprising: (1) a series of amplifiers each having the non-linearity defects of one of the amplifiers in said chain; and (2) a plurality of second phase-shift circuits interposed between respective adjacent pairs of said amplifiers, said second phase-shift circuits causing said series of amplifiers to exhibit, to the nearest $2K\pi$, $K = 1, 2, 3 \ldots$, the same phase law exhibited by said chain of amplifiers.

2. The apparatus according to claim 1 wherein said balancing circuit further comprises:
   (c) first and second hybrid circuits connected, one to the other, to define an upper main branch and a lower main branch, said upper main branch including a third, serially connected, phase-shift circuit and said lower main branch including, in series connection:
      (1) a line of adjustable loss;
      (2) a phase-inverter; and, interposed therebetween,
      (3) third and fourth hybrid circuits connected, one to the other, to define an upper secondary branch and a lower secondary branch, said upper secondary branch having a fourth phase-shift circuit serially connected therein and said source of compensation noise being connected in said lower secondary branch.

3. The apparatus according to claim 2 further comprising an amplifier of variable gain serially connected with said fourth phase-shift network in said upper secondary branch.

4. Apparatus for reducing the intermodulation noise generated in a chain of amplifiers, said apparatus being designed for connection to the output of said chain and comprising:
   (a) a first phase-shift circuit, having an input connected to the output of said chain and an output, for at least partially compensating for the phase distortion and phase jumps in said chain; and
   (b) a balancing circuit having an input connected to the output of said first phase-shift circuit, said balancing circuit including a source of compensation noise comprising:
      (1) at least one amplifier having the same non-linear defects as at least a portion of said chain; and
      (2) at least one frequency filter serially connected with said amplifier for neutralizing the action of said source of compensation noise over a part of the passband of said chain of amplifiers.

5. The apparatus according to claim 4 wherein said balancing circuit further comprises:
   (c) first and second hybrid circuits connected, one to the other, to define an upper main branch and a lower main branch, said upper main branch including a second, serially connected, phase-shift circuit and said lower main branch including, in series connection:
      (1) a line of adjustable loss;
      (2) a first band filter; connected to the output of said adjustable loss line;
      (3) a phase inverter;
      (4) a second band filter connected to the output of said phase inverter; and interposed between said first band filter and said phase-inverter,
      (5) third and fourth hybrid circuits connected, one to the other, to define an upper and a lower secondary branch, said upper secondary branch having a third phase shift circuit serially connected therein and said source of compensation noise being connected in said lower secondary branch.

6. The apparatus according to claim 5 further comprising an amplifier of variable gain serially connected with said third phase-shift network in said upper secondary branch.

7. The apparatus according to claim 4, 5 or 6 comprising a plurality of noise reducing apparatus in tandem, each compensating for the intermodulation products in a distinct frequency band.

* * * * *